(12) United States Patent
Xia (10) Patent No.: US 10,442,050 B2
(45) Date of Patent: Oct. 15, 2019

(54) ROTARY TABLE DEVICE AND METHOD OF CONTROLLING THE ROTARY TABLE DEVICE

(71) Applicant: FANUC CORPORATION, Yamanashi (JP)

(72) Inventor: Zhizhen Xia, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/112,981

(22) Filed: Aug. 27, 2018

(65) Prior Publication Data

US 2019/0070704 A1 Mar. 7, 2019

(30) Foreign Application Priority Data

Sep. 1, 2017 (JP) .................. 2017-168120

(51) Int. Cl.
*B23Q 16/10* (2006.01)
*F16D 55/22* (2006.01)
*F16D 66/00* (2006.01)
*F16D 121/06* (2012.01)

(52) U.S. Cl.
CPC ........... *B23Q 16/105* (2013.01); *F16D 55/22* (2013.01); *F16D 66/00* (2013.01); *B23Q 2220/004* (2013.01); *F16D 2066/006* (2013.01); *F16D 2121/06* (2013.01)

(58) Field of Classification Search
CPC . B23Q 16/105; B23Q 2220/004; F16D 55/22; F16D 66/00; F16D 2066/006; F16D 2121/06
See application file for complete search history.

(56) References Cited

U.S. PATENT DOCUMENTS

| 9,533,392 | B2 * | 1/2017 | Nishimura | ......... G05B 19/4155 |
| 2002/0161494 | A1 * | 10/2002 | Martin | ................... B60T 17/22 |
| | | | | 701/33.9 |
| 2010/0175505 | A1 * | 7/2010 | Tatsuda | ................ B23Q 16/102 |
| | | | | 74/813 L |
| 2015/0360337 | A1 | 12/2015 | Nishimura et al. | |

(Continued)

FOREIGN PATENT DOCUMENTS

| CN | 201385130 Y | 1/2010 |
| JP | H05204429 A | 8/1993 |

(Continued)

OTHER PUBLICATIONS

Decision to Grant a Patent issued by the Japanese Patent Office in relation to Japanese Application No. 2017-168120 dated May 21, 2019 (3 pages) along with English language translation (2 pages).

*Primary Examiner* — Vicky A Johnson
(74) *Attorney, Agent, or Firm* — Robert P. Michal, Esq.; Carter, DeLuca & Farrell LLP (57) ABSTRACT

In a method of controlling a rotary table device, a clamp mechanism drive unit is controlled to unclamp a brake disk. Thereafter, a pressure of working fluid supplied to an unclamp fluid chamber is decreased, and a motor drive unit is controlled to rotate a motor. Then, the abrasion quantity of the piston and the clamp member is calculated based on a reference pressure and a pressure when the load torque of a spindle exceeded a reference load torque.

14 Claims, 6 Drawing Sheets

(56) References Cited

U.S. PATENT DOCUMENTS

| | | | |
|---|---|---|---|
| 2016/0008939 A1* | 1/2016 | Masuya | B23Q 11/0092 29/64 |
| 2016/0096227 A1 | 4/2016 | Hori et al. | |
| 2016/0207156 A1* | 7/2016 | Xia | B23Q 16/105 |
| 2016/0243660 A1* | 8/2016 | Nishimura | B23Q 16/105 |
| 2017/0136593 A1* | 5/2017 | Xia | B23Q 16/105 |
| 2017/0326702 A1* | 11/2017 | Osaki | B23Q 11/005 |
| 2019/0070704 A1* | 3/2019 | Xia | B23Q 16/105 |

FOREIGN PATENT DOCUMENTS

| | | |
|---|---|---|
| JP | 2010247257 A | 11/2010 |
| JP | 2014-065106 A | 4/2014 |
| JP | 2016-002613 A | 1/2016 |
| JP | 2016-074050 A | 5/2016 |

* cited by examiner

ROTARY TABLE DEVICE AND METHOD OF CONTROLLING THE ROTARY TABLE DEVICE

CROSS-REFERENCE TO RELATED APPLICATION

This application is based upon and claims the benefit of priority from Japanese Patent Application No. 2017-168120 filed on Sep. 1, 2017, the contents of which are incorporated herein by reference.

BACKGROUND OF THE INVENTION

Field of the Invention

The present invention relates to a rotary table device having a clamp mechanism, for supporting an object as a target of machining in a rotatable manner. Further, the present invention relates to a method of controlling the rotary table device.

Description of the Related Art

In machine tools like a machining center, etc., rotary tables such as an index table have been used widely. As disclosed in Japanese Laid-Open Patent Publication No. 2016-002613, in general, a clamp mechanism is provided for a rotary table. The clamp mechanism is used for fixing the rotary position of a spindle which rotates an object as a target of machining. This clamp mechanism holds a brake disk which rotates together with the spindle between a clamp member and a piston to fix the rotary position of the spindle.

SUMMARY OF THE INVENTION

However, abrasion of the contact surface between the clamp member and the brake disk of the piston occurs due to friction. As the abrasion quantity of the clamp member and the piston increases, the clamping force is reduced undesirably. Therefore, there is a demand to check the abrasion state of the clamp member and the piston.

To this end, an object of the present invention is to provide a rotary table device which makes it possible to calculate the abrasion quantity of a clamp mechanism and a piston, and provide a method of controlling the rotary table device.

According to a first aspect of the present invention, a rotary table device including a clamp mechanism is provided. The clamp mechanism includes a brake disk configured to rotate together with a spindle which rotates a workpiece, a piston configured to move in a clamping direction in which the brake disk is clamped and an unclamping direction in which the brake disk is unclamped, a clamp member configured to hold the brake disk between the clamp member and the piston which has moved in the clamping direction, and a biasing member configured to bias the piston by a restoration force of elastic deformation in the clamping direction. The rotary table device includes a clamp mechanism drive unit configured to supply working fluid to a clamp fluid chamber to move the piston in the clamping direction, in a case of clamping the brake disk, and supply the working fluid to an unclamp fluid chamber to move the piston in the unclamping direction and change a pressure of the supplied working fluid, in a case of unclamping the brake disk, a motor drive unit configured to drive the motor which rotates the spindle, a pressure detection unit configured to detect the pressure of the working fluid, a load detection unit configured to detect the load torque of the spindle, a drive control unit configured to control the clamp mechanism drive unit to unclamp the brake disk, and thereafter, decrease the pressure of the working fluid supplied to the unclamp fluid chamber and control the motor drive unit to rotate the motor, and an abrasion quantity calculation unit configured to calculate an abrasion quantity of the piston and the clamp member based on a reference pressure and the pressure of the working fluid when the load torque of the spindle exceeded the reference load torque.

According to a second aspect of the present invention, a method of controlling a rotary table device including a clamp mechanism is provided. The clamp mechanism includes a brake disk configured to rotate together with a spindle which rotates a workpiece, a piston configured to move in a clamping direction in which the brake disk is clamped and an unclamping direction in which the brake disk is unclamped, a clamp member configured to hold the brake disk between the clamp member and the piston which has moved in the clamping direction, and a biasing member configured to bias the piston by a restoration force of elastic deformation in the clamping direction. The rotary table device includes a clamp mechanism drive unit configured to supply working fluid to a clamp fluid chamber to move the piston in the clamping direction, in a case of clamping the brake disk, and supply the working fluid to an unclamp fluid chamber to move the piston in the unclamping direction and change a pressure of the supplied working fluid, in a case of unclamping the brake disk, and a motor drive unit configured to drive the motor which rotates the spindle. The method includes the steps of detecting the pressure of the working fluid, detecting the load torque of the spindle, controlling the clamp mechanism drive unit to unclamp the brake disk, and thereafter, decrease the pressure of the working fluid supplied to the unclamp fluid chamber and control the motor drive unit to rotate the motor, and calculating an abrasion quantity of the piston and the clamp member based on a reference pressure and the pressure of the working fluid when the load torque of the spindle exceeded the reference load torque.

In the present invention, it is possible to calculate easily the abrasion quantity of the piston and the clamp member for clamping the brake disk.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a rotary table device according to the present invention and a method of controlling the rotary table device will be described in detail with reference to the accompanying drawings.

Figure 1:
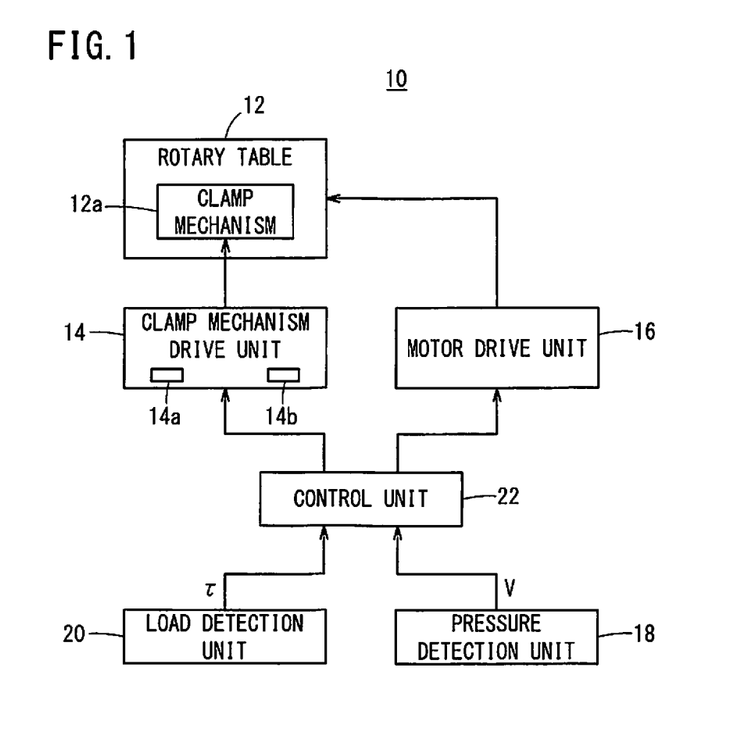
FIG. 1 is a diagram showing structure of a rotary table device.

FIG. 1 is a diagram showing structure of a rotary table device 10. The rotary table device 10 includes a rotary table 12 having a clamp mechanism 12a, a clamp mechanism drive unit 14, a motor drive unit 16, a pressure detection unit 18, a load detection unit 20, and a control device 22.

Figure 2:
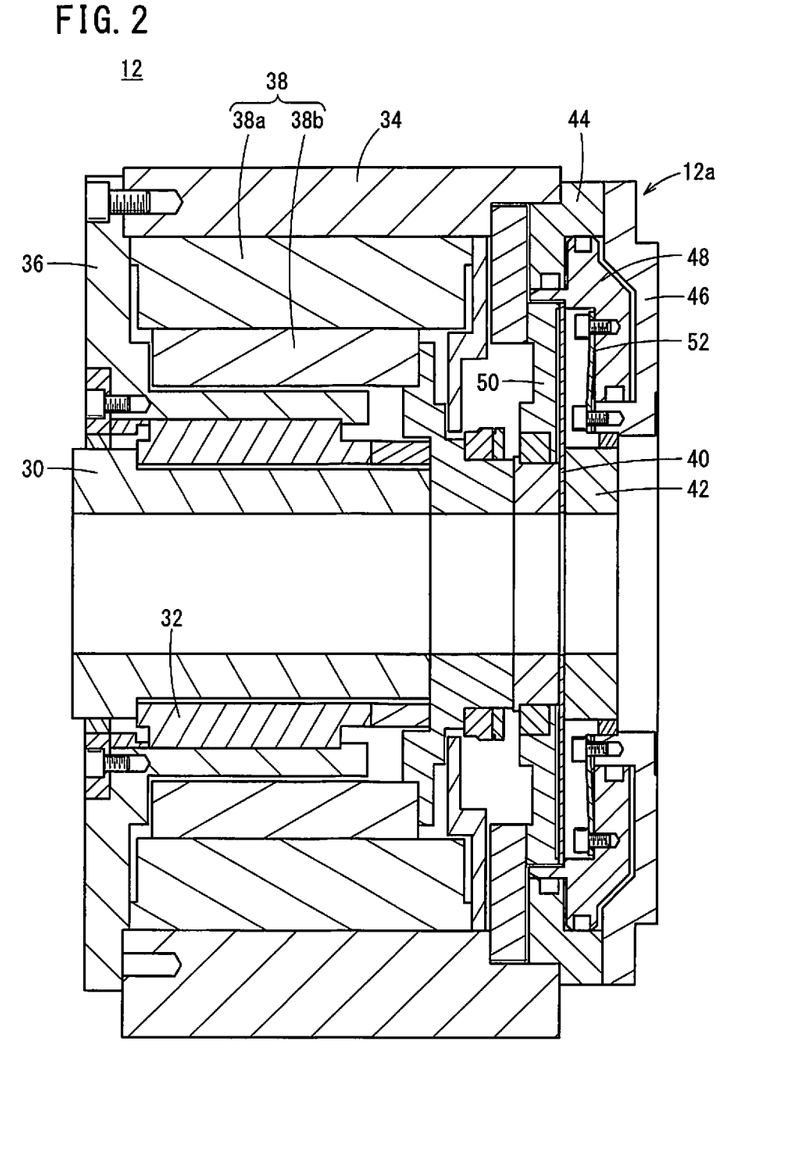
FIG. 2 is a cross sectional view of a rotary table shown in FIG. 1.
Figure 3:
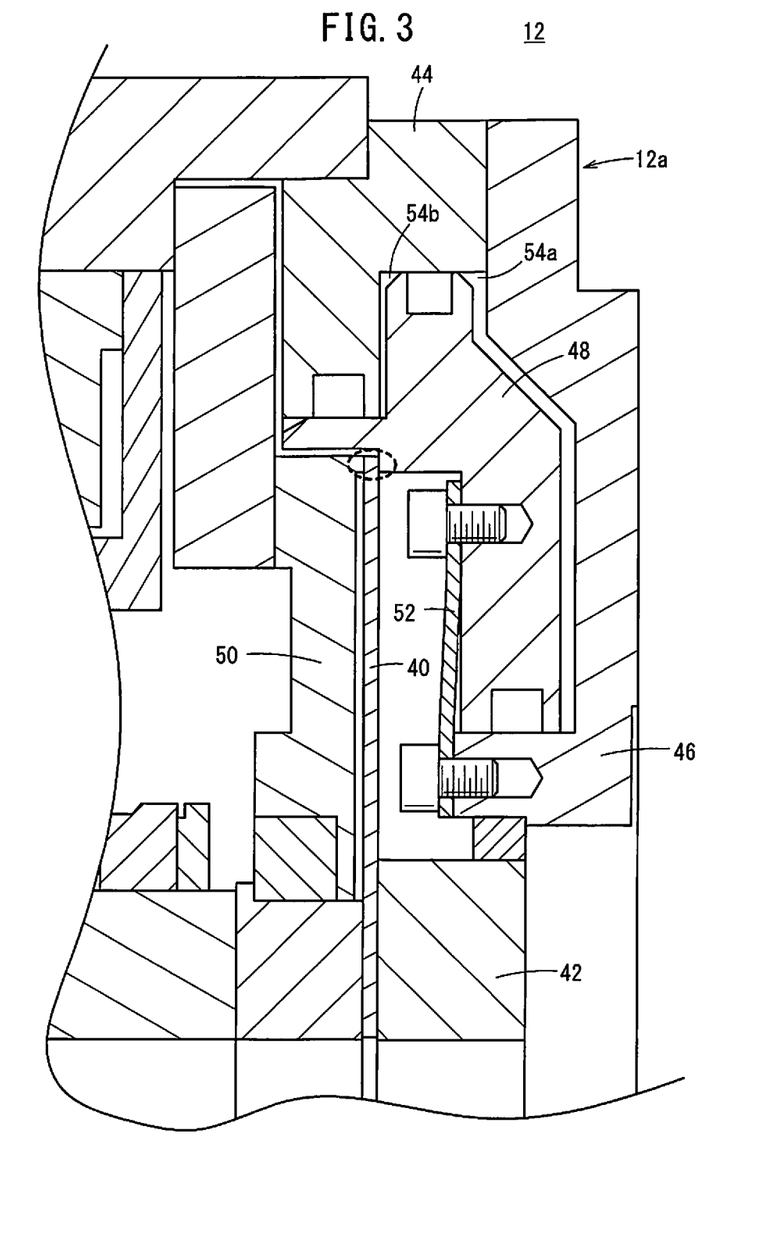
FIG. 3 is a partially-enlarged cross sectional view of the rotary table shown in FIG. 2.

First, the rotary table 12 will be described with reference to FIGS. 2 and 3. FIG. 2 is a cross sectional view of the rotary table 12. FIG. 3 is a partially-enlarged cross sectional view of the rotary table 12. The rotary table 12 is a table which supports an object to be machined (a machining target or a workpiece) in a rotatable manner. A spindle 30 of the rotary table 12 is supported by a housing 36 fixed to a case 34 of the rotary table 12 through a bearing 32. That is, the spindle 30 is supported by the housing 36 in a manner rotatable with respect to the case 34 and the housing 36. The spindle 30 rotates the workpiece, and the workpiece is detachably fixed to an end of the spindle 30. A stator 38a of a motor 38 for rotating the spindle 30 is fixed to the housing 36, and a rotor 38b of the motor 38 is attached to the spindle 30.

A braking disk 40 is held between an end surface of the spindle 30 and an end surface of an attachment member 42. The attachment member 42 is fixed to the spindle 30. The brake disk 40 is rotatable with respect to the case 34, and the brake disk 40 rotates together with the spindle 30. The brake disk 40 is provided oppositely from a side where the housing 36 of the case 34 is provided.

A cylinder 44 and a rear plate 46 are attached to a side where the brake disk 40 of the case 34 is provided. A piston 48 is provided in a groove formed by the cylinder 44 and the rear plate 46. The piston 48 is provided movably in directions in which the brake disk 40 is clamped and unclamped. Hereinafter, the moving direction of the piston 48 in which the brake disk 40 is clamped will be simply referred to as a clamping direction, and the moving direction of the piston 48 in which the brake disk 40 is unclamped will be simply referred to as an unclamping direction.

A clamp member 50 fixed to the case 34 faces a disk surface of the brake disk 40. The brake disk 40 is positioned between the piston 48 and the clamp member 50. The brake disk 40 is clamped by being held between the clamp member 50 and the piston 48 moved in the clamping direction. The contact area between the piston 48 and the clamp member 50 and the brake disk 40 (area within an ellipse line denoted by a dotted line in FIG. 3) is abraded (thinned gradually) over time due to the use of the clamp mechanism 12a.

A biasing member 52 made up of a plate spring, etc. biases the piston 48 by a restoration force generated by elastic deformation, in the clamping direction. An end of the biasing member 52 is fixed to the piston 48, and the other end of the biasing member 52 is fixed to the rear plate 46. The brake disk 40, the attachment member 42, the cylinder 44, the rear plate 46, the piston 48, the clamp member 50, and the biasing member 52 form the clamp mechanism 12a.

The piston 48 moves in the clamping direction and the unclamping direction by operation of working fluid of a gas such as air or a liquid such as oil. The clamp mechanism 12a includes a clamp fluid chamber 54a and an unclamp fluid chamber 54b.

The working fluid is supplied to the clamp fluid chamber 54a to move the piston 48 in the clamping direction. Thus, the brake disk 40 is clamped. Further, the working fluid is supplied to the unclamp fluid chamber 54b to move the piston 48 in the unclamping direction against the biasing force of the biasing member 52. In this manner, the brake disk 40 is unclamped. FIGS. 2 and 3 show a state where the brake disk 40 is clamped by the clamp mechanism 12a.

In the case of moving the piston 48 in the clamping direction, the working fluid of the unclamp fluid chamber 54b is discharged to the outside, and in the case of moving the piston 48 in the unclamping direction, the operation fluid of the clamp fluid chamber 54a is discharged to the outside.

The clamp mechanism drive unit 14 shown in FIG. 1 moves the piston 48 using the working fluid. The clamp mechanism drive unit 14 includes a solenoid valve 14a for switching the flow of the working fluid. The solenoid valve 14a performs switching between (1) operation to supply the working fluid to the clamp fluid chamber 54a and discharge the working fluid from the unclamp fluid chamber 54b, or (2) operation to supply the working fluid to the unclamp fluid chamber 54b and discharge the working fluid from the clamp fluid chamber 54a. The clamp mechanism drive unit 14 includes a pressure regulating unit 14b for regulating the pressure V of the supplied working fluid.

The motor drive unit 16 drives the motor 38 provided in the rotary table 12. The motor drive unit 16 supplies electrical current to the motor 38 (more specifically, wound wires (windings) provided at the stator 38a), to drive the motor 38 (rotate the rotor 38b). Thus, the spindle 30 is rotated. The clamp mechanism drive unit 14 and the motor drive unit 16 are controlled by the control device 22.

The pressure detection unit 18 detects the pressure V of the working fluid supplied from the clamp mechanism drive unit 14. The load detection unit 20 detects the load torque τ of the spindle 30 as an output shaft of the motor 38. The load detection unit 20 may detect the load torque τ of the spindle 30 by detecting the value of the electrical current supplied to the motor 38.

Figure 4:
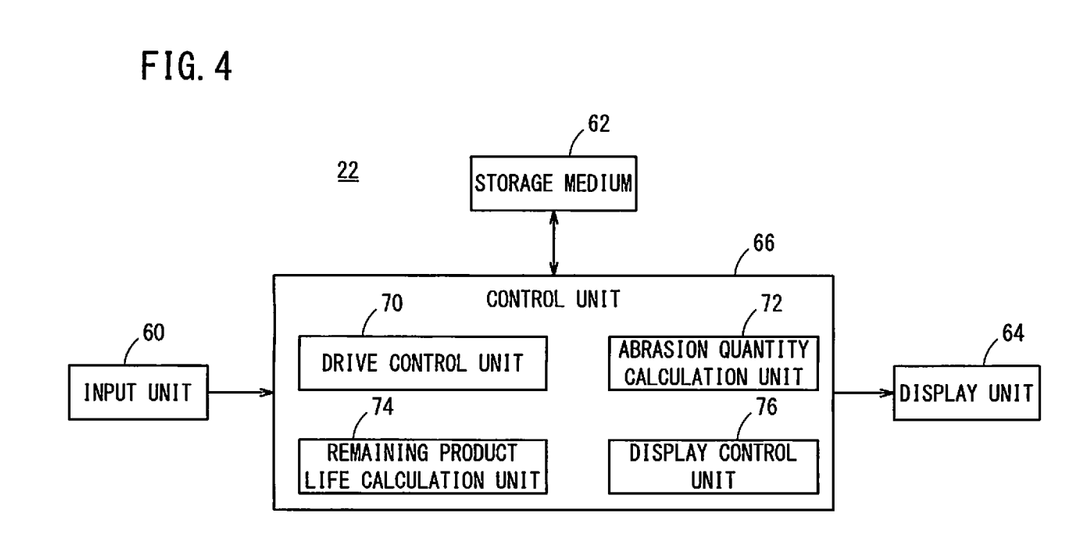
FIG. 4 is a diagram showing structure of a control device shown in FIG. 1.

FIG. 4 is a diagram showing structure of the control device 22. The control device 22 includes an input unit 60, a storage medium 62, a display unit 64, and a control unit 66. The input unit 60 is an operation unit for receiving inputs of an operator. For example, the input unit 60 is made up of a keyboard, a mouse, a touch panel, etc. The storage medium 62 stores required information. For example, the storage medium 62 comprises a volatile memory, a nonvolatile memory, a hard disk drive, etc. The display unit 64 comprises a liquid crystal display, an organic EL display, etc., and displays required information.

The control unit 66 includes a drive control unit 70, an abrasion quantity calculation unit 72, a remaining product life calculation unit 74, and a display control unit 76. FIG. 4 shows structure of the control unit 66, required for executing a diagnostic mode to diagnose the clamp mechanism 12a.

The drive control unit 70 controls the clamp mechanism drive unit 14 (specifically, the solenoid valve 14a) to clamp the brake disk 40, and unclamp the brake disk 40. That is, the drive control unit 70 controls the clamp mechanism drive unit 14 (specifically, the solenoid valve 14a) to supply working fluid to the clamp fluid chamber 54a to move the piston 48 in the clamping direction, and supplies the working fluid to the unclamp fluid chamber 54*b* to move the piston 48 in the unclamping direction.

The drive control unit 70 controls the pressure regulating unit 14*b* to change the pressure V of the supplied working fluid. The drive control unit 70 may implement feedback control of the pressure V of the working fluid based on the pressure V detected by the pressure detection unit 18. At the time of clamping, and unclamping the brake disk 40, in principle, the drive control unit 70 controls the pressure regulating unit 14*b* in a manner that the pressure V of the working fluid becomes the predetermined pressure Vs.

The drive control unit 70 controls the motor drive unit 16 to drive (rotate) the motor 38. The drive control unit 70 controls the motor drive unit 16 to rotate the motor 38 at a command speed. An encoder (not shown) is provided for the motor 38 to detect the rotation position and the rotation speed of the motor 38, and the drive control unit 70 implements feedback control of the motor 38 based on a detection signal detected by the encoder.

When the control is switched to the diagnostic mode by operation of the input unit 60 by the operator, the drive control unit 70 controls the clamp mechanism drive unit 14 to unclamp the brake disk 40 by the working fluid at a predetermined pressure Vs, and thereafter, gradually decreases the pressure V of the working fluid supplied to the unclamp fluid chamber 54*b*. Further, in the diagnostic mode, the drive control unit 70 controls the motor drive unit 16 to rotate the motor 38 at a predetermined constant rotation speed.

The abrasion quantity calculation unit 72 calculates the abrasion quantity $\Delta W_n$ of the piston 48 and the clamp member 50 based on the pressure $V_n$ detected by the pressure detection unit 18 when the load torque $\tau$ of the spindle 30 (motor 38) detected by the load detection unit 20 exceeds a reference load torque $\tau s$, and the reference pressure $V_0$. It should be noted that $\Delta W_n$ is the abrasion quantity calculated in the diagnosis mode (diagnosis mode for the n-th time) which was executed currently, and $V_n$ denotes the pressure V of the working fluid when the load torque $\tau$ of the spindle 30 exceeded the reference load torque $\tau s$ in the diagnosis mode (diagnosis mode for the n-th time) which was executed currently.

Specifically, the abrasion quantity calculation unit 72 calculates the abrasion quantity using the following equation (1):

$$\Delta W_n = (V_0 - V_n) \cdot S/k \tag{1}$$

where S denotes an effective area of the unclamp fluid chamber 54*b*, $k$ denotes a modulus of elasticity of the biasing member 52, and n denotes an integer of 1 or more. The reference voltage $V_0$, the effective area S, and the modulus of elasticity k are stored in the storage medium 62. The method of deriving the equation (1) will be described later briefly.

The reference load torque $\tau s$ is a torque generated by adding a predetermined torque $\alpha$ to the load torque $\tau_0$ of the spindle 30 when the motor 38 is rotated by unclamping the brake disk 40 using the working fluid at the predetermined pressure Vs. That is, the reference load torque $\tau s$ is shown by $\tau s = \tau_0 + \alpha$. The reference torque $\tau s$ is calculated by the abrasion quantity calculation unit 72.

The reference pressure $V_0$ is a pressure V of the working fluid when the load torque $\tau$ of the spindle 30 exceeds the reference load torque $\tau s$, in the state where the piston 48 and the clamp member 50 have no abrasion, after the brake disk 40 is unclamped, the pressure V of the working fluid supplied to the unclamp fluid chamber 54*b* is decreased, and the motor 38 is rotated.

Figure 5:
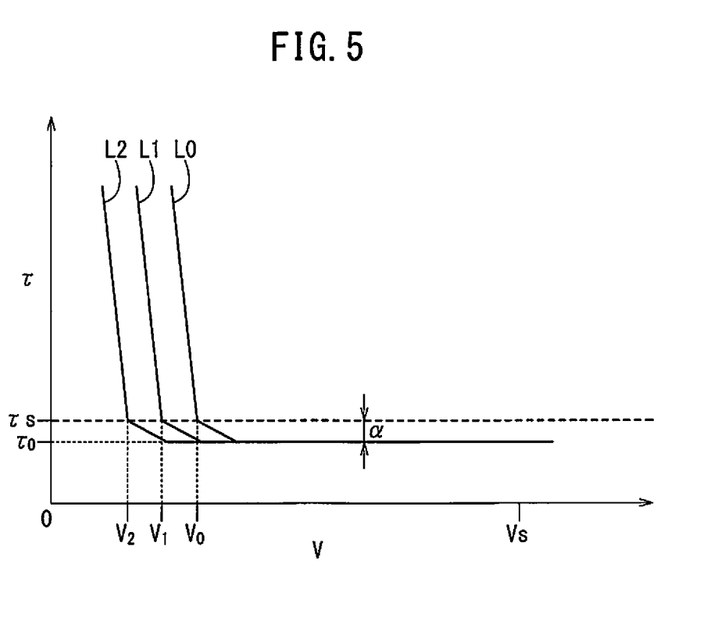
FIG. 5 is a graph showing the relationship between the pressure and the load torque when a brake disk is unclamped by working fluid at predetermined pressure, in accordance with the abrasion quantity of the piston and the clamp member, and thereafter, the pressure of the working fluid supplied to an unclamp fluid chamber is decreased.

FIG. 5 is a graph showing the relationship between the pressure V and the load torque $\tau$ when the brake disk 40 is unclamped by the working fluid at the predetermined pressure Vs, in accordance with the abrasion quantity $\Delta W_n$ of the piston 48 and the clamp member 50, and thereafter, the pressure V of the working fluid supplied to the unclamp fluid chamber 54*b* is decreased. It is assumed that, at this time, the motor 38 rotates at a predetermined constant rotation speed.

A line L0 indicates the relationship between the pressure V and the load torque $\tau$ in the state where the piston 48 and the clamp member 50 do not have abrasion (the piston 48 and the clamp member 50 are brand new). A line L1 indicates the relationship between the pressure V and the load torque $\tau$ when the diagnostic mode (n=1, diagnostic mode for the first time) is executed after the elapse of a first usage time from the brand new state. A line L2 indicates the relationship between the pressure V and the load torque $\tau$ when the diagnostic mode (n=2, diagnostic mode for the second time) is executed after the elapse of a second usage time which is longer than the first usage time, from the brand new state. It can be seen that, as the usage time increases, the piston 48 and the clamp member 50 have more abrasion, and the abrasion quantity $\Delta W_n$ becomes large.

After the brake disk 40 is unclamped by the working fluid at the predetermined pressure Vs, the pressure V of the working fluid supplied to the unclamp fluid chamber 54*b* is decreased. When the pressure V of the working fluid becomes smaller than the biasing force of the biasing member 52, the piston 48 starts to move in the clamping direction. As a result, the load torque $\tau$ of the spindle 30 (motor 38) is increased.

In this regard, when the abrasion quantity $\Delta W_n$ is 0, the biasing force of the biasing member 52 in the clamping direction is becomes the largest, and as the abrasion quantity $\Delta W_n$ increases, the biasing force of the biasing member 52 in the clamping direction is decreased. The reason why, as the abrasion quantity $\Delta W_n$ increases, the biasing force of the biasing member 52 in the clamping direction is decreased, is as follows. That is, as the abrasion quantity $\Delta W_n$ increases, the contact position of the piston 48 with the brake disk 40 moves in the clamping direction to a greater extent, and the restoration force of the biasing member 52 is reduced. Therefore, as the abrasion quantity $\Delta W_n$ increases, the pressure $V_n$ of the working fluid when the load torque $\tau$ of the spindle 30 exceeds the reference load torque $\tau s$ becomes low.

The pressure V of the working fluid when the load torque $\tau$ of the spindle 30 shown by the line L0 exceeds the reference load torque $\tau s$ is the reference pressure V0. The pressure V of the working fluid when the load torque $\tau$ of the spindle 30 shown by the line L1 exceeds the reference load torque $\tau s$ is $V_{n=1}$. The pressure V of the working fluid when the load torque $\tau$ of the spindle 30 shown by the line L2 exceeds the reference load torque $\tau s$ is $V_{n=2}$.

As can be seen from FIG. 5, the load torque $\tau_0$ of the spindle 30 (motor 38) when the brake disk 40 is unclamped by the working fluid at the predetermined pressure Vs does not change regardless of the abrasion state of the piston 48 and the clamp member 50. Therefore, the reference load torque $\tau s$ ($=\tau_0 + \alpha$) may be stored in the storage medium 62 beforehand. In this case, there is no need for the abrasion quantity calculation unit 72 to calculate the reference load torque $\tau s$.

Next, a method of deriving the equation (1) will be described briefly. In the case where the piston 48 and the clamp member 50 are brand new, the force $F_0$ which presses the piston 48 in the clamping direction when the load torque $\tau$ of the spindle 30 exceeds the reference load torque $\tau s$ can be shown by the following equation (2). In the case where the n-th diagnosis mode is executed, the force $F_n$ which presses the piston 48 in the clamping direction when the load torque $\tau$ of the spindle 30 exceeds the reference load torque $\tau s$ can be shown by the following equation (3). Further, the abrasion quantity $\Delta W_n$ at the time of executing the n-th diagnostic mode and the pressing forces $F_0$, $F_n$ can be shown by the following equation (4):

$$F_0 = V_0 \cdot S \tag{2}$$

$$F_n = V_n \cdot S \tag{3}$$

$$F_n = F_0 - \Delta W_n \cdot k \tag{4}$$

The above equation (1) can be derived from the above equations (2) to (4).

The remaining product life calculation unit 74 calculates the remaining product life $LT_n$ until the abrasion quantity $\Delta W_n$ of the piston 48 and the clamp member 50 reaches the predetermined maximum abrasion quantity $\Delta W_{max}$ based on the abrasion quantity $\Delta W_n$ calculated by the abrasion quantity calculation unit 72. The maximum abrasion quantity $\Delta W_{max}$ is stored in the recording medium 62.

The remaining product life calculation unit 74 calculates the remaining product life $LT_n$ based on the abrasion quantity $\Delta W_{n-j}$ calculated in the past (j-th times before) and the abrasion quantity $\Delta W_n$ calculated currently, the time interval between the timing $T_{n-j}$ at which the abrasion quantity calculation unit 72 calculated the abrasion quantity $\Delta W_{n-1}$ in the past and the timing $T_n$ at which the abrasion quantity calculation unit 72 calculated the abrasion quantity $\Delta W_n$ currently, and the maximum abrasion quantity $\Delta W_{max}$. It should be noted that the remaining product life $LT_n$ indicates the remaining product life calculated by executing the current diagnosis mode (n-th diagnostic mode).

Specifically, the remaining product life calculation unit 74 calculates the remaining product life $LT_n$ based on the following equation (5):

$$LT_n = (T_n - T_{n-j}) \cdot (\Delta W_{max} - \Delta W_n)/(\Delta W_n - \Delta W_{n-j}) \tag{5}$$

where n denotes an integer of 2 or more, and j denotes an integer of 1 or more but less than n.

The display control unit 76 displays the remaining product life $LT_n$ calculated by the remaining product life calculation unit 74 on the display unit 64. The display control unit 76 may display the abrasion quantity $\Delta W_n$ and the maximum abrasion quantity $\Delta W_{max}$, calculated by the abrasion quantity calculation unit 72 instead of the remaining product life $LT_n$. It is because, it is possible for the operator to recognize the remaining product life $LT_n$ of the piston 48 and the clamp member 50 to some extent if the current abrasion quantity $\Delta W_n$ and the maximum abrasion quantity $\Delta W_{max}$ are known. Further, the display control unit 76 may simply display the abrasion quantity $\Delta W_n$ calculated by the abrasion quantity calculation unit 72 on the display unit 64. In this manner, the operator can recognize the degree of abrasion.

Figure 6:
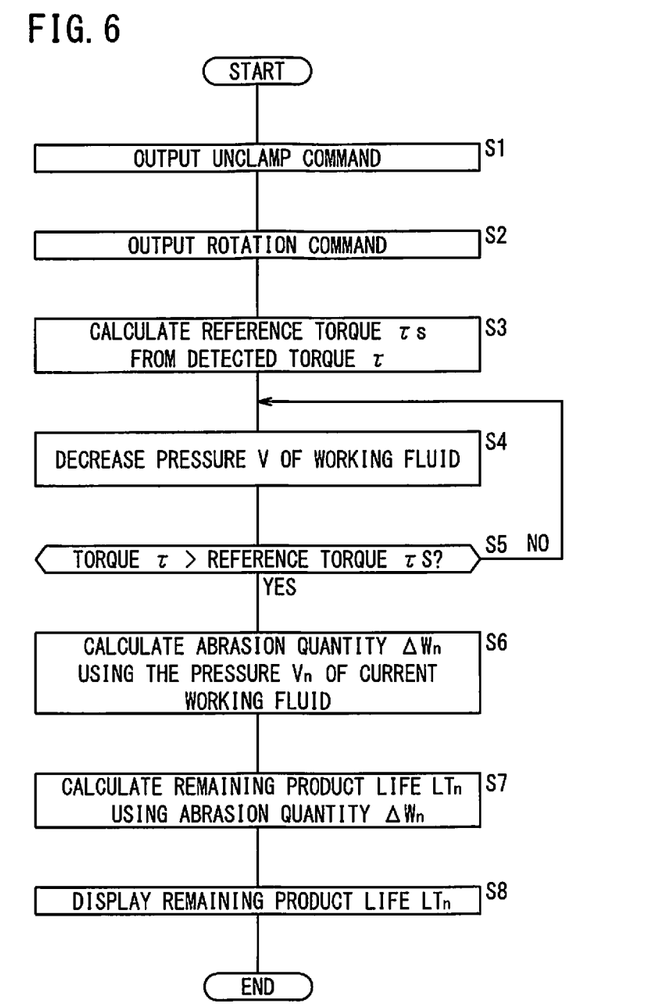
FIG. 6 is a flow chart showing operation of executing a diagnostic mode.

Next, operation of executing the diagnostic mode will be described with reference to a flow chart of FIG. 6. It should be noted that operation shown in FIG. 6 is executed when the operator sets the diagnostic mode by operating the input unit 60. During execution of the diagnostic mode, the pressure detection unit 18 and the load detection unit 20 detect the pressure V and the load torque $\tau$ at predetermined cycles.

In step S1, the drive control unit 70 outputs an unclamp command to the clamp mechanism drive unit 14. When the clamp mechanism drive unit 14 receives the unclamp command, the clamp mechanism drive unit 14 supplies working fluid at predetermined pressure Vs to the unclamp fluid chamber 54b. As a result, the brake disk 40 is unclamped.

Then, in step S2, the drive control unit 70 outputs a rotation command to the motor drive unit 16. When the motor drive unit 16 receives the rotation command, the motor drive unit 16 drives the motor 38 in a manner that the motor 38 rotates at a constant rotation speed.

Then, in step S3, the abrasion quantity calculation unit 72 calculates the reference load torque $\tau s$ from the load torque $\tau$ detected by the load detection unit 20. At the timing of calculating the reference load torque $\tau s$, the brake disk 40 is completely unclamped.

Then, in step S4, the drive control unit 70 controls the clamp mechanism drive unit 14 to decrease the pressure V of the working fluid supplied to the unclamp fluid chamber 54b gradually.

Then, in step S5, the abrasion quantity calculation unit 72 determines whether or not the load torque $\tau$ detected by the load detection unit 20 most recently has exceeded the reference load torque $\tau s$. The routine returns to step S4 until the load torque $\tau$ detected most recently has exceeded the reference load torque $\tau s$. If it is determined that the load torque $\tau$ detected most recently has exceeded the reference load torque $\tau s$, the routine proceeds to step S6.

When the routine proceeds to step S6, the abrasion quantity calculation unit 72 calculates the abrasion quantity $\Delta W_n$, using the pressure $V_n$ of the current working fluid, i.e., using the pressure $V_n$ of the working fluid detected most recently by the pressure detection unit 18. The abrasion quantity calculation unit 72 calculates the abrasion quantity $\Delta W_n$ using the equation (1).

Then, in step S7, the remaining product life calculation unit 74 calculates the remaining product life $LT_n$ using the abrasion quantity $\Delta W_n$ calculated in step S6. The remaining product life calculation unit 74 performs this calculation using the equation (5).

Then, in step S8, the display control unit 76 displays the remaining product life $LT_n$ calculated in step S7 on the display unit 64. The display control unit 76 may display the abrasion quantity $\Delta W_n$ calculated in step S6 and the maximum abrasion quantity $\Delta W_{max}$ on the display unit 64, or may simply display the abrasion quantity $\Delta W_n$ calculated in step S6 on the display unit 64. It should be noted that operation in step S7 is not required in the case where the remaining product life $LT_n$ is not calculated.

Embodiment Examples

The above embodiment can be modified in the following manner.

Modified Embodiment 1

In the embodiment as described above, when the diagnostic mode is executed, in the state the motor 38 is rotated at a constant rotation speed, the pressure V of the working fluid supplied to the unclamp fluid chamber 54b is decreased gradually. Alternatively, decrease in the pressure V of the working fluid and the rotation of the motor 38 may be repeated alternately until the load torque $\tau$ exceeds the reference load torque $\tau s$. For example, after the pressure V of the working fluid is decreased by a certain pressure, the motor 38 is rotated at a constant rotation speed, and if the load torque τ of the spindle 30 does not exceed the reference load torque τs, rotation of the motor 38 is temporarily stopped. Then, operation of decreasing the pressure V of the working fluid further by the certain pressure, and rotating the motor 38 again by a constant rotation speed may be repeated until the load torque τ of the spindle 30 exceeds the reference load torque τs.

Modified Embodiment 2

In the above embodiment and the modified example 1, the spindle 30 is attached to the rotor 38b of the motor 38. Alternatively, the spindle 30 may be provided at the output shaft attached to the rotor 38b of the motor 38. In this case, the load detection unit 20 may detect the load torque τ of the output shaft of the motor 38. Though the embodiment has been described in connection with the case of using the rotary table 12 of a direct drive mechanism, it may be possible to adopt a rotary table connected to an output shaft of the motor 38 and the spindle 30 through a deceleration mechanism.

[Technical Ideas Derived from the Embodiments]

Technical ideas which can be understood from the embodiment and the modified examples 1, 2 will be described below.

<First Technical Idea>

The rotary table device (10) includes the clamp mechanism (12a). The clamp mechanism (12a) includes the brake disk (40) configured to rotate together with the spindle (30) which rotates the workpiece, the piston (48) configured to move in the clamping direction in which the brake disk (40) is clamped and the unclamping direction in which the brake disk (40) is unclamped, the clamp member (50) configured to hold the brake disk (40) between the clamp member (50) and the piston (48) which has moved in the clamping direction, and the biasing member (52) configured to bias the piston (48) by the restoration force of the elastic deformation in the clamping direction. The rotary table device (10) includes the clamp mechanism drive unit (14), the motor drive unit (16), the pressure detection unit (18), the load detection unit (20), the drive control unit (70), and the abrasion quantity calculation unit (72). In the case of clamping the brake disk (40), the clamp mechanism drive unit (14) is configured to supply the working fluid to the clamp fluid chamber (54a) to move the piston (48) in the clamping direction. In the case of unclamping the brake disk (40), the clamp mechanism drive unit (14) is configured to supply the working fluid to the unclamp fluid chamber (54b) to move the piston (48) in the unclamping direction, and change the pressure (V) of the supplied working fluid. The motor drive unit (16) is configured to drive the motor (38) which rotates the spindle (30). The pressure detection unit (18) is configured to detect the pressure (V) of the working fluid. The load detection unit (20) is configured to detect the load torque (τ) of the spindle (30). The drive control unit (70) is configured to control the clamp mechanism drive unit (14) to unclamp the brake disk (40), and thereafter, decrease the pressure (V) of the working fluid supplied to the unclamp fluid chamber (54b), and control the motor drive unit (16) to rotate the motor (38). The abrasion quantity calculation unit (72) is configured to calculate the abrasion quantity ($\Delta W_n$) of the piston (48) and the clamp member (50) based on the reference pressure ($V_0$) and the pressure ($V_n$) of the working fluid when the load torque (τ) of the spindle (30) exceeded the reference load torque (τs).

In this manner, it is possible to calculate easily the abrasion quantity ($\Delta W_n$) of the piston (48) and the clamp member (50).

The reference load torque (τs) may be a torque generated by adding a predetermined torque (α) to the load torque ($\tau_0$) of the spindle (30) when the motor (38) is rotated by unclamping the brake disk (40) using the working fluid at the predetermined pressure (Vs). In this manner, it is possible to calculate easily the abrasion quantity ($\Delta W_n$) of the piston (48) and the clamp member (50).

The reference pressure ($V_0$) may be a pressure (V) of the working fluid when the load torque (τ) of the spindle (30) exceeds the reference load torque (τs), in the state where the piston (48) and the clamp member (50) have no abrasion, after the brake disk (40) is unclamped, the pressure (V) of the working fluid supplied to the unclamp fluid chamber (54b) is decreased, and the motor (38) is rotated. Thus, it is possible to calculate easily the abrasion quantity ($\Delta W_n$) of the piston (48) and the clamp member (50).

The abrasion quantity calculation unit (72) may be configured to calculate the abrasion quantity ($\Delta W_n$) of the piston (48) and the clamp member (50) using the above described equation (1). In the equation (1), S denotes the effective area of the unclamp fluid chamber (54b), k denotes the modulus of elasticity of the biasing member (52), and n is an integer of 1 or more. In this manner, it is possible to calculate easily the abrasion quantity ($\Delta W_n$) of the piston (48) and the clamp member (50).

The rotary table device (10) may include the remaining product life calculation unit (74) configured to calculate the remaining product life ($LT_n$) until the abrasion quantity ($\Delta W_n$) of the piston (48) and the clamp member (50) reaches the predetermined maximum abrasion quantity ($\Delta W_{max}$) based on the abrasion quantity ($\Delta W_n$) calculated by the abrasion quantity calculation unit (72). In this manner, it is possible to calculate easily the remaining product life ($LT_n$) of the piston (48) and the clamp member (50).

The remaining product life calculation unit (74) may be configured to calculate the remaining product life ($LT_n$) based on the abrasion quantity ($\Delta W_{n-j}$) calculated in the past (before j-th times) and the abrasion quantity ($\Delta W_n$) calculated currently by the abrasion quantity calculating unit (72), the time interval between the timing ($T_{n-j}$) at which the abrasion quantity ($\Delta W_{n-j}$) was calculated in the past (before j-th times) and the timing ($T_n$) at which the abrasion quantity ($\Delta W_n$) was calculated currently by the abrasion quantity calculating unit (72), and the maximum abrasion quantity ($\Delta W_{max}$). In this manner, it is possible to calculate easily the remaining product life ($LT_n$) of the piston (48) and the clamp member (50).

The remaining product life calculation unit (74) may be configured to calculate the remaining product life ($LT_n$) using the above equation (5). It should be noted that n is an integer of 2 or more, and j is an integer of 1 or more but less than n. Therefore, it is possible to calculate easily the product life ($LT_n$) of the piston (48) and the clamp member (50).

<Second Technical Idea>

The clamp mechanism (12a) provided for the rotary table device (10) includes the brake disk (40) configured to rotate together with the spindle (30) which rotates the workpiece, the piston (48) configured to move in the clamping direction in which the brake disk (40) is clamped and the unclamping direction in which the brake disk (40) is unclamped, the clamp member (50) configured to hold the brake disk (40) between the clamp member (50) and the piston (48) which has moved in the clamping direction, and a biasing member (52) configured to bias the piston (48) by a restoration force of elastic deformation in the clamping direction. The rotary table device (10) includes the clamp mechanism drive unit (14) configured to supply working fluid to the clamp fluid chamber (54a) to move the piston (48) in the clamping direction, in the case of clamping the brake disk (40), and supply the working fluid to the unclamp fluid chamber (54b) to move the piston (48) in the unclamping direction and change the pressure (V) of the supplied working fluid, in the case of unclamping the brake disk (40), and the motor drive unit (16) configured to drive the motor (38) which rotates the spindle (30). The method of controlling the rotary table device (10) includes the steps of detecting the pressure (V) of the working fluid, detecting the load torque ($\tau$) of the spindle (30), controlling the clamp mechanism drive unit (14) to unclamp the brake disk (40), and thereafter, decrease the pressure (V) of the working fluid supplied to the unclamp fluid chamber (54b) and control the motor drive unit (16) to rotate the motor (38), and calculating the abrasion quantity ($\Delta W_n$) of the piston (48) and the clamp member (50) based on the reference pressure ($V_0$) and the pressure ($V_n$) of the working fluid when the load torque ($\tau$) of the spindle (30) exceeded the reference load torque ($\tau s$).

In this manner, it is possible to calculate easily the abrasion quantity ($\Delta W_n$) of the piston (48) and the clamp member (50).

The reference load torque ($\tau s$) may be a torque generated by adding a predetermined torque ($\alpha$) to the load torque ($\tau_0$) of the spindle (30) when the motor (38) is rotated by unclamping the brake disk (40) using the working fluid at the predetermined pressure (Vs). In this manner, it is possible to calculate easily the abrasion quantity ($\Delta W_n$) of the piston (48) and the clamp member (50).

The reference pressure (V0) may be a pressure (V) of the working fluid when the load torque ($\tau$) of the spindle (30) exceeds the reference load torque ($\tau s$), in the state where the piston (48) and the clamp member (50) have no abrasion, after the brake disk (40) is unclamped, the pressure (V) of the working fluid supplied to the unclamp fluid chamber (54b) is decreased, and the motor (38) is rotated. In this manner, it is possible to calculate easily the abrasion quantity ($\Delta W_n$) of the piston (48) and the clamp member (50).

In the step of calculating the abrasion quantity, the abrasion quantity ($\Delta W_n$) of the piston (48) and the clamp member (50) may be calculated using the above equation (1). In the equation (1), S is the effective area of the unclamp fluid chamber (54b), k is the modulus of elasticity of the biasing member (52), and n is an integer of 1 or more. In this manner, it is possible to calculate easily the abrasion quantity ($\Delta W_n$) of the piston (48) and the clamp member (50).

The method of controlling the rotary table device (10) may include the step of calculating the remaining product life ($LT_n$) until the abrasion quantity ($\Delta W_n$) of the piston (48) and the clamp member (50) reaches the predetermined maximum abrasion quantity ($\Delta W_{max}$) based on the abrasion quantity ($\Delta W_n$) calculated in the step of calculating the abrasion quantity. In this manner, it is possible to calculate easily the remaining product life ($LT_n$) of the piston (48) and the clamp member (50).

In the step of calculating the remaining product life, the remaining product life ($LT_n$) may be calculated based on the abrasion quantity ($\Delta W_{n-j}$) calculated in the past (before j-th times) and the abrasion quantity ($\Delta M_n$) calculated currently in the step of calculating the abrasion quantity, the time interval between the timing ($T_{n-j}$) at which the abrasion quantity ($\Delta W_{n-j}$) was calculated in the past (before j-th times) and the timing ($T_n$) at which the abrasion quantity ($\Delta W_n$) was calculated currently in the step of calculating the abrasion quantity, and the maximum abrasion quantity ($\Delta W_{max}$). In this manner, it is possible to calculate easily the remaining product life ($LT_n$) of the piston (48) and the clamp member (50).

In the step of calculating the remaining product life, the remaining product life ($LT_n$) may be calculated using the above equation (5). In the equation (5), n is an integer of 2 or more, and j denotes an integer of 1 or more but less than n. Therefore, it is possible to calculate easily the product life ($LT_n$) of the piston (48) and the clamp member (50).

While the invention has been particularly shown and described with reference to the preferred embodiment, it will be understood that variations and modifications can be effected thereto by those skilled in the art without departing from the scope of the invention as defined by the appended claims.

What is claimed is:

1. A rotary table device including a clamp mechanism, the clamp mechanism comprising:
    a brake disk configured to rotate together with a spindle which rotates a workpiece;
    a piston configured to move in a clamping direction in which the brake disk is clamped and an unclamping direction in which the brake disk is unclamped;
    a clamp member configured to hold the brake disk between the clamp member and the piston which has moved in the clamping direction; and
    a biasing member configured to bias the piston by a restoration force of elastic deformation in the clamping direction,
    the rotary table device comprising:
    a clamp mechanism drive unit configured to supply working fluid to a clamp fluid chamber to move the piston in the clamping direction, in a case of clamping the brake disk, and supply the working fluid to an unclamp fluid chamber to move the piston in the unclamping direction and change a pressure of the supplied working fluid, in a case of unclamping the brake disk,
    a motor drive unit configured to drive the motor which rotates the spindle;
    a pressure detection unit configured to detect the pressure of the working fluid;
    a load detection unit configured to detect the load torque of the spindle;
    a drive control unit configured to control the clamp mechanism drive unit to unclamp the brake disk, and thereafter, decrease the pressure of the working fluid supplied to the unclamp fluid chamber and control the motor drive unit to rotate the motor; and
    an abrasion quantity calculation unit configured to calculate an abrasion quantity of the piston and the clamp member based on a reference pressure and the pressure of the working fluid when the load torque of the spindle exceeded the reference load torque.

2. The rotary table device according to claim 1, wherein the reference load torque is a torque generated by adding a predetermined torque to the load torque of the spindle when the motor is rotated by unclamping the brake disk using the working fluid at a predetermined pressure.

3. The rotary table device according to claim 1, wherein the reference pressure is a pressure of the working fluid when the load torque of the spindle exceeds the reference load torque, in a state where the piston and the clamp member have no abrasion, after the brake disk is unclamped, the pressure of the working fluid supplied to the unclamp fluid chamber is decreased, and the motor is rotated.

4. The rotary table device according to claim 1, wherein the abrasion quantity calculation unit is configured to calculate the abrasion quantity of the piston and the clamp member using a following equation (1):

$$\Delta W_n = (V_0 - V_n) \cdot S / k \qquad (1)$$

where $\Delta W_n$ is the abrasion quantity calculated currently, $V_0$ is the reference pressure, $V_n$ is the pressure of the working fluid when the load torque of the spindle exceeded the reference load torque, S is an effective area of the unclamp fluid chamber, k is a modulus of elasticity of the biasing member, and n is an integer of 1 or more.

5. The rotary table device according to claim 1, further comprising a remaining product life calculation unit configured to calculate a remaining product life until the abrasion quantity of the piston and the clamp member reaches a predetermined maximum abrasion quantity based on the abrasion quantity calculated by the abrasion quantity calculation unit.

6. The rotary table device according to claim 5, wherein the remaining product life calculation unit is configured to calculate the remaining product life based on the abrasion quantity calculated in past and the abrasion quantity calculated currently by the abrasion quantity calculating unit, a time interval between a timing at which the abrasion quantity was calculated in the past and a timing at which the abrasion quantity was calculated currently by the abrasion quantity calculating unit, and the maximum abrasion quantity.

7. The rotary table device according to claim 6, wherein the remaining product life calculation unit is configured to calculates the remaining product life using the following equation (2):

$$LT_n = (T_n - T_{n-j}) \cdot (\Delta W_{max} - \Delta W_n) / (\Delta W_n - \Delta W_{n-j}) \qquad (2)$$

where $LT_n$ denotes the remaining product life, $\Delta W_n$ denotes the abrasion quantity calculated currently, $\Delta W_{n-j}$ denotes the abrasion quantity calculated j-th times before, $T_n$ denotes the timing at which the abrasion quantity $\Delta W_n$ was calculated, $T_{n-j}$ denotes the timing at which the abrasion quantity $\Delta W_{n-j}$ was calculated, $\Delta W_{max}$ denotes the maximum abrasion quantity, n is an integer of 2 or more, and j denotes an integer of 1 or more but less than n.

8. A method of controlling a rotary table device including a clamp mechanism, the clamp mechanism comprising:
a brake disk configured to rotate together with a spindle which rotates a workpiece;
a piston configured to move in a clamping direction in which the brake disk is clamped and an unclamping direction in which the brake disk is unclamped;
a clamp member configured to hold the brake disk between the clamp member and the piston which has moved in the clamping direction; and
a biasing member configured to bias the piston by a restoration force of elastic deformation in the clamping direction,
the rotary table device comprising:
a clamp mechanism drive unit configured to supply working fluid to a clamp fluid chamber to move the piston in the clamping direction, in a case of clamping the brake disk, and supply the working fluid to an unclamp fluid chamber to move the piston in the unclamping direction and change a pressure of the supplied working fluid, in a case of unclamping the brake disk; and
a motor drive unit configured to drive the motor which rotates the spindle;
the method comprising the steps of:
detecting the pressure of the working fluid;
detecting the load torque of the spindle;
controlling the clamp mechanism drive unit to unclamp the brake disk, and thereafter, decrease the pressure of the working fluid supplied to the unclamp fluid chamber and control the motor drive unit to rotate the motor; and
calculating an abrasion quantity of the piston and the clamp member based on a reference pressure and the pressure of the working fluid when the load torque of the spindle exceeded the reference load torque.

9. The method of controlling the rotary table device according to claim 8, wherein the reference load torque is a torque generated by adding a predetermined torque to the load torque of the spindle when the motor is rotated by unclamping the brake disk using the working fluid at a predetermined pressure.

10. The method of controlling the rotary table device according to claim 8, wherein the reference pressure is a pressure of the working fluid when the load torque of the spindle exceeds the reference load torque, in a state where the piston and the clamp member have no abrasion, after the brake disk is unclamped, the pressure of the working fluid supplied to the unclamp fluid chamber is decreased, and the motor is rotated.

11. The method of controlling the rotary table device according to claim 8, wherein, in the step of calculating the abrasion quantity, the abrasion quantity of the piston and the clamp member is calculated using a following equation (3):

$$\Delta W_n = (V_0 - V_n) \cdot S / k \qquad (3)$$

where $\Delta W_n$ is the abrasion quantity calculated currently, $V_0$ is the reference pressure, $V_n$ is the pressure of the working fluid when the load torque of the spindle exceeded the reference load torque, S is an effective area of the unclamp fluid chamber, k is a modulus of elasticity of the biasing member, and n is an integer of 1 or more.

12. The method of controlling the rotary table device according to claim 8, comprising the step of calculating a remaining product life until the abrasion quantity of the piston and the clamp member reaches a predetermined maximum abrasion quantity based on the abrasion quantity calculated in the step of calculating the abrasion quantity.

13. The method of controlling the rotary table device according to claim 12, wherein, in the step of calculating the remaining product life, the remaining product life is calculated based on the abrasion quantity calculated in past and the abrasion quantity calculated currently in the step of calculating the abrasion quantity, a time interval between a timing at which the abrasion quantity was calculated in the past and a timing at which the abrasion quantity was calculated currently in the step of calculating the abrasion quantity, and the maximum abrasion quantity.

14. The method of controlling the rotary table device according to claim 13, wherein, in the step of calculating the remaining product life, the remaining product life is calculated using the following equation (4):

$$LT_n = (T_n - T_{n-j}) \cdot (\Delta W_{max} - \Delta W_n) / (\Delta W_n - \Delta W_{n-j}) \qquad (4)$$

where $LT_n$ denotes the remaining product life, $\Delta W_n$ denotes the abrasion quantity calculated currently, $\Delta W_{n-j}$ denotes the abrasion quantity calculated j-th times before, $T_n$ denotes the timing at which the abrasion quantity $\Delta W_n$ was calculated, $T_{n-j}$ denotes the timing at which the abrasion quantity $\Delta W_{n-j}$ was calculated, $\Delta W_{max}$ denotes the maximum abrasion quantity, n is an integer of 2 or more, and j denotes an integer of 1 or more but less than n.

* * * * *